US006502985B1

(12) United States Patent
Garland et al.

(10) Patent No.: US 6,502,985 B1
(45) Date of Patent: Jan. 7, 2003

(54) AUTO-COLLIMATING DIGITAL X-RAY SYSTEM

(75) Inventors: Harry T. Garland, Los Altos Hills; Gerald May, Saratoga, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/565,645

(22) Filed: May 5, 2000

(51) Int. Cl.[7] .......................... G01D 18/00; G21K 1/02
(52) U.S. Cl. ........................ 378/207; 378/150; 378/151
(58) Field of Search ................................ 378/207, 147, 378/150, 151, 145

(56) References Cited

U.S. PATENT DOCUMENTS

| | | | | |
|---|---|---|---|---|
| 5,844,962 A | * | 12/1998 | Kunert | 378/150 |
| 6,208,762 B1 | | 3/2001 | Garland et al. | 382/254 |
| 6,215,853 B1 | * | 4/2001 | Kump et al. | 378/151 |
| 6,259,767 B1 | * | 7/2001 | Neumann et al. | 378/151 |

* cited by examiner

*Primary Examiner*—Drew A. Dunn
(74) *Attorney, Agent, or Firm*—Fitzpatrick, Cella, Harper & Scinto

(57) ABSTRACT

A system and method for automatically collimating X-rays. A digital X-ray system (100) includes a generator (108), a sensor unit (110), a control station (112), and a preview monitor (114). The generator (108) generates X-ray radiation that is captured by the sensor unit (110) as a digital image and transmitted to the control station (112). The captured image is displayed on the preview monitor (114). The generator (108) includes a collimator (212) that collimates the generated radiation into a primary beam of X-rays. The size and shape of the primary beam can be adjusted by modifying collimation parameters. A short duration beam of X-rays is generated by the generator (108) and captured (414) by the sensor unit (110). This step is repeated as necessary or desired. The resulting digital images are analyzed (418) by the control station (112) to calculate a calibration coefficient. Another short duration beam of X-rays is generated and a reference image is captured (514). The control station (112) analyzes the reference image and uses the calibration coefficient to collimate the collimator (212) to achieve a desired goal, such as radiating all or only part of an object being radiated. Once the collimator (212) is adjusted, the X-ray image of the subject is exposed.

16 Claims, 4 Drawing Sheets

FIG. I

AUTO-COLLIMATING DIGITAL X-RAY SYSTEM

BACKGROUND

1. Field of the Invention

This invention pertains in general to X-ray systems and in particular to a method and system for collimating the X-rays in such systems.

2. Background of the Invention

Since the discovery of X-rays in 1895 by Wilhelm Roentgen, the predominant method for capturing an X-ray image has been by exposing a photographic film. A disadvantage of using photographic film is that chemical processing must be performed on it to convert the latent X-ray image into a viewable image. Because of this chemical processing, there is a delay between when the film is exposed and when the image is viewable. For medical X-ray images taken in the emergency room, for example, this delay in viewing the image can be critical. Chemical processing of the film, moreover, requires special handling and disposal of the chemicals in order to avoid environmental contamination.

In recent years, computed radiography (CR) has provided a means to take X-ray images without using photographic film or chemical processing. When using CR, the X-ray image is captured with a photostimulable luminescent plate. The plate is then placed in a special scanner to convert the captured image into a digital form for subsequent viewing at a computer workstation. Though this technique eliminates the use of photo processing chemicals, there is still a significant delay introduced before the X-ray image is viewable.

More recently, a technique known as digital radiography (DR) has been developed that eliminates both the need for chemical processing and the significant delay in producing a viewable image. In DR, a sensor unit, typically an array of amorphous silicon, is used to capture the X-ray image and produce a digital representation of the image. The sensor unit is coupled to a control station with a cable or other communications link. The cable provides power to the sensor unit and transmits digital communication signals between the sensor unit and the control station. Accordingly, the control station receives substantially real-time data describing the X-rays detected by the sensor plate.

In all of the above X-ray systems, there is a need to aim the X-ray generator and collimate the X-rays before capturing the image. Typically, the generated X-rays pass through an adjustable collimator having an aperture that restricts the size and shape of the primary beam of X-ray radiation. Collimation serves to: 1) reduce scatter from X-rays not required for imaging, thereby improving image quality; and 2) reduce unnecessary X-ray exposure to the patient. Before exposing the X-ray image, an X-ray technologist manually adjusts the collimator by shining a light located at or near the X-ray generator onto the X-ray sensor or the patient's anatomical region of interest. The technologist observes the light reflecting off the sensor plate or patient and manually adjusts the aperture in the collimator. Once the light is properly collimated, the X-ray image is exposed.

In a fast-paced medical environment, such as a hospital emergency room or a busy clinic, the technologist wastes valuable time and resources when visually collimating the X-ray generator. Moreover, locating the collimating light near the generator adds an extra level of complexity to the generator design. Therefore, there is a need for an X-ray system that simplifies the collimation process. Preferably, the system would reduce the time and effort expended by the X-ray technologist to collimate the X-rays and would not need a visible light to perform collimation.

SUMMARY OF THE INVENTION

The above needs are met by a digital X-ray system (100) having a generator (108) and a sensor unit (110) in communication with the control station (112). In addition to the sensor unit (110) and control station (112), the digital X-ray system (100) preferably includes a preview monitor and operation panel (114) for controlling the X-ray system (100), an image archiver (116) for storing images captured by the sensor unit (110), a viewing workstation (118) for viewing and manipulating the images stored in the archiver (116), and a hard copy output device (120) for printing the images. In a preferred embodiment of the present invention, the sensor unit (110) captures the digital X-ray images and transmits the images to the control station (112). Then, the images can be manipulated by the other components of the X-ray system (100).

The generator (108) preferably includes a radiation source such as an X-ray tube (210) and a collimator (212). The collimator (212) includes a portion blocking the radiation, an adjustable aperture (226) through which a primary beam of radiation passes, and an actuator (230) for adjusting the aperture. By adjusting collimation parameters which affect the size and shape of the aperture (226), the size and shape of the primary beam can be adjusted.

The sensor unit (110) is surrounded by a protective cover (310). Within the cover (310) are preferably a scintillator (312), a sensor plate (314), and sensor electronics (316). When the sensor unit (110) is exposed to X-rays, the scintillator (312) converts the X-rays into visible light. The position and intensity of the light is detected by the sensor plate (314) and stored as a digital image. The digital image is then transmitted to the control station (112).

In use, the aperture (226) is constricted (410) and a relatively short duration beam is directed (412) at the sensor unit (110). The resulting digital image is transmitted (416) to the control station (112). This process is repeated one or more times with a displaced aperture (226) and the control station (112) calculates (428) a calibration coefficient from the captured digital images. This coefficient is preferably stored (430) in the control station (112).

To capture an X-ray image of a subject, a reference image is captured (514) from a short-duration beam and transmitted (516) to the control station (112). The control station (112) analyzes (518) the reference image and uses the calibration coefficient to adjust the aperture (226) to achieve a desired goal. In one embodiment, the aperture (226) is adjusted to cover the entire field of the sensor plate (314). In another embodiment, the aperture (226) is adjusted to restrict the X-ray beam and eliminate unwanted exposure beyond the periphery of the X-ray subject. In yet another embodiment, the technologist views the digital image and defines an area of exposure. The control station (112) automatically calculates aperture (226) parameters to restrict the beam to precisely the defined area. Once the aperture (226) is adjusted, the image of the X-ray subject is captured (526).

DETAILED DESCRIPTION OF THE PREFERRED EMBODIMENTS

Figure 1:
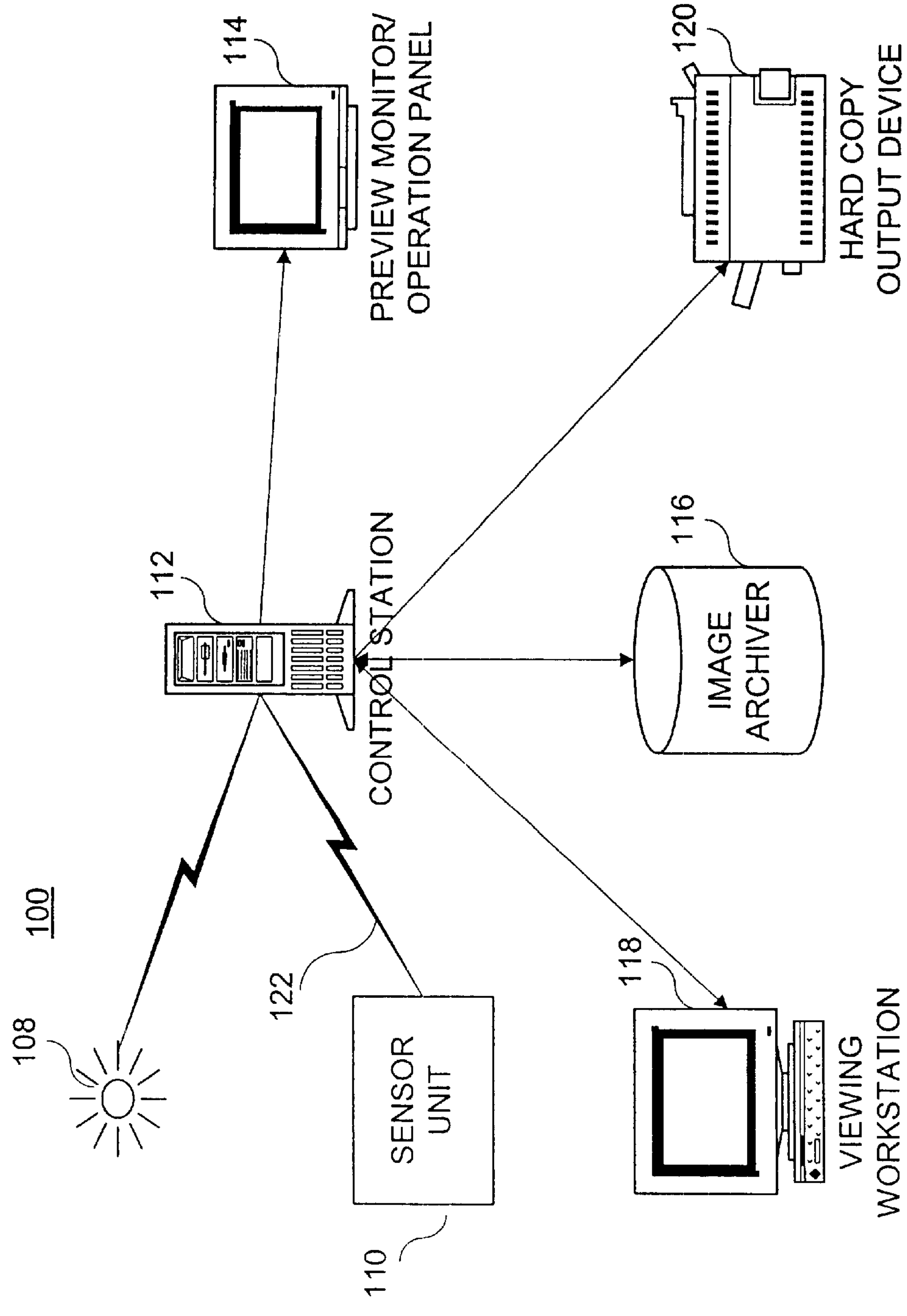
FIG. 1 is a block diagram of a digital X-ray system 100 according to an embodiment of the present invention.

FIG. 1 is a block diagram of a digital X-ray system 100 according to an embodiment of the present invention. A sensor unit 110 is in communication with a control station 112. The control station 112, in turn, is preferably coupled to a preview monitor/operation panel 114, an image archiver 116, a viewing workstation 118, and a hard copy output device 120.

In one embodiment, an X-ray generator 108 generates X-rays that are captured as digital data by the sensor unit 110. The digital data are transmitted from the sensor unit 110 to the control station 112 via a communications link 122, which in one embodiment is the wireless link described in U.S. application Ser. No. 09/251,755, entitled WIRELESS X-RAY SYSTEM, filed on Feb. 18, 1999, assigned to the same assignee as the present invention and hereby incorporated by reference herein. The control station 112 preferably stores the digital data as a digital image in a temporary storage. In addition, the control station 112 transmits the digital image to the operation panel 114 which preferably displays the image on a preview monitor 114. An X-ray technologist preferably uses the image displayed on the preview monitor 114 to evaluate the quality of the image, input patient and exposure information, if necessary, and direct the image to be stored in the image archiver 116.

In another embodiment, the control station 112 transmits a list of patient names and other information to the sensor unit 110 before the X-ray images are captured. The sensor unit 110 stores the names in a memory and displays the names on an alphanumeric display. The X-ray technologist matches a displayed name with the patient before taking the X-ray image. When the image is captured, the name of the patient is preferably encoded with the image according to the Digital Imaging and Communications in Medicine (DICOM) standard. The X-ray image is transferred to the control station 112.

The image archiver 116 preferably stores hundreds or thousands of digital images. An X-ray technologist can use the viewing workstation 118 to retrieve an image from the. archiver 116, display the image on a display coupled to the viewing workstation 118, and perform assorted image manipulations, as described, for example, in U.S. patent application Ser. No. 09/057,083 now U.S. Pat. No. 6,208, 762, entitled OPTIMIZED ENHANCEMENT OF DIGITAL IMAGES, filed on Apr. 8, 1998, assigned to the same assignee as the present application, and hereby incorporated by reference herein. The hard copy output device 120 prints copies of images stored in the image archiver 116.

Figure 2:
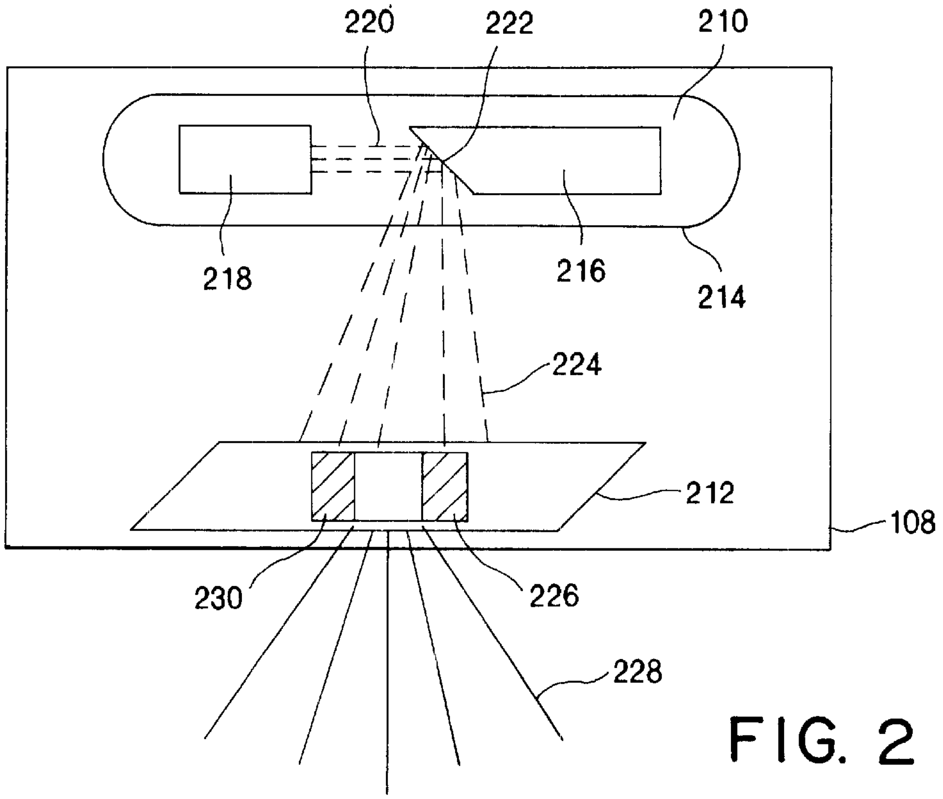
FIG. 2 is a high-level cutaway view of an embodiment of the generator 108 of the digital X-ray system 100, including an X-ray tube 210 and a collimator 212.

FIG. 2 is a high-level cutaway view of an embodiment of the generator 108, including an X-ray tube 210 and a collimator 212. The illustrated generator 108 demonstrates the functionality of a typical generator and is not necessarily representative of an actual X-ray generator. An X-ray system 100 according to the present invention may use any source of X-ray radiation and should not be limited to the generator 108 of FIG. 2.

The X-ray tube 210 is surrounded by a sealed glass envelope 214. Within the envelope are an anode 216 and a cathode 218. The cathode emits electrons 220, which strike a target 222 on the anode 216. The interaction of the electrons 220 with the electrons and positively charged nuclei of the target 222 generates X-ray radiation 224. The energy of the X-ray emission is controlled by the voltage applied to the tube 210. The X-rays 224 radiate from the target 222 and a portion of the X-rays encounter the collimator 212.

The collimator 212 contains a sheet of lead or other material that blocks the X-ray radiation. An adjustable aperture 226 in the collimator 212 allows a “primary beam” 228 of X-ray radiation to pass through the collimator 212. The size and shape of the primary beam 228 is controlled by adjusting the size and shape of the aperture 226. In one embodiment, an actuator 230 controls the aperture 226. The actuator 230 is preferably either a servo motor or a stepper motor and is operated by a control signal from the control station 112.

Figure 3:
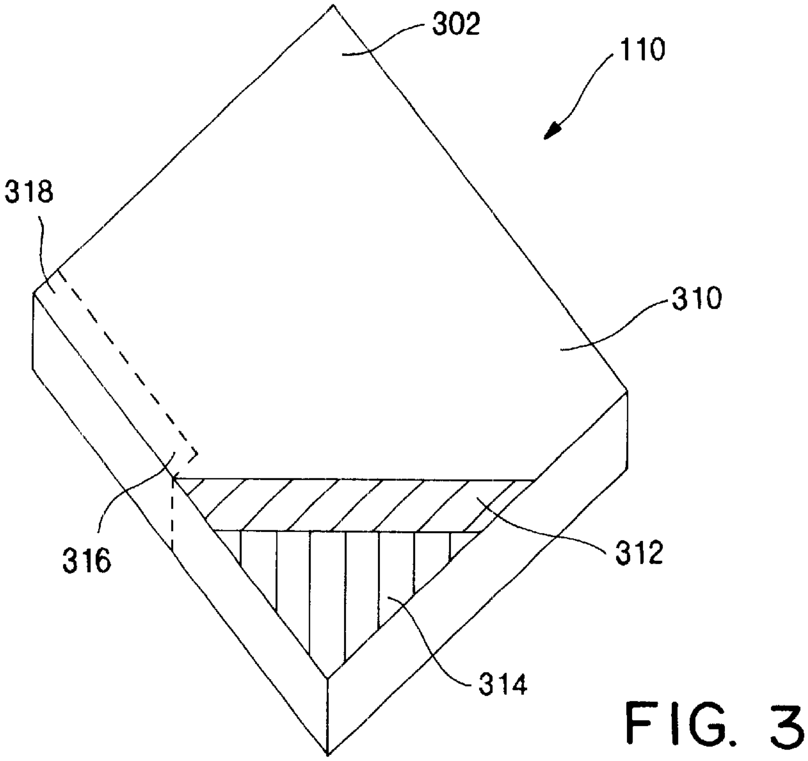
FIG. 3 is a cutaway perspective illustration of the sensor unit 110 of the digital X-ray system 100 according to an embodiment of the present invention.

FIG. 3 is a cutaway perspective illustration of the sensor unit 110 according to an embodiment of the present invention. FIG. 3 illustrates the top 302 of the sensor unit 110, defined as the side receiving the primary beam 328 from the X-ray generator 108, and the various lower layers of the sensor unit 110. The sensor unit 110 is surrounded by a protective cover 310. Within the cover 310 are a scintillator 312 and a sensor plate 314. As is well known in the art of X-ray detection, the scintillator 312 preferably converts X-ray energy into visible light. The visible light from the scintillator 312 is detected by the sensor plate 314, which digitally records the location and intensity of each light flash. In one embodiment of the present invention, the sensor unit 110 produces digital X-ray images having 2688×2688 12-bit (4096 gray scale) pixels.

Figure 4:
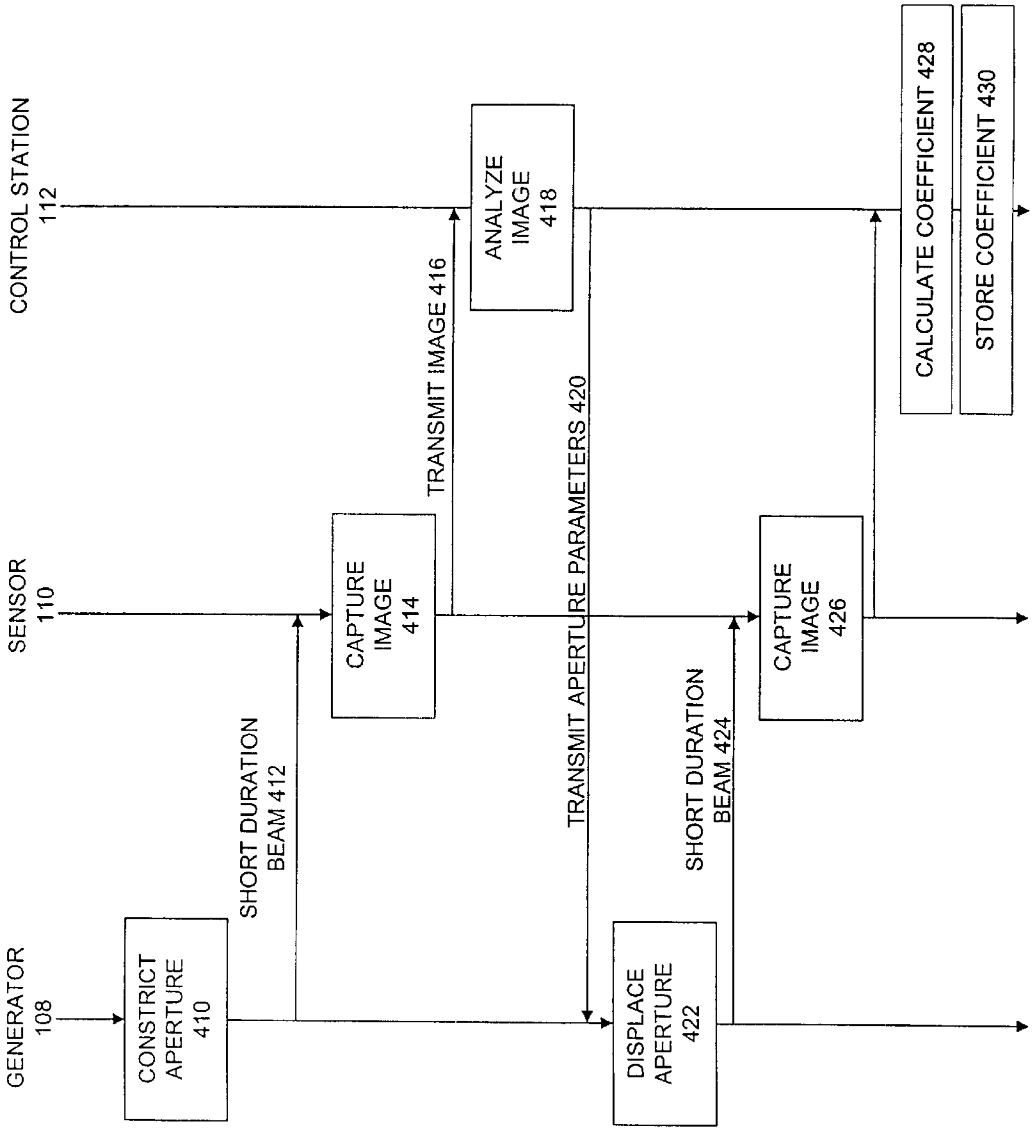
FIG. 4 is a flow diagram illustrating the interactions between the generator 108, the sensor unit 110, and the control station 112 when calculating the calibration coefficient.

FIG. 4 is a flow diagram illustrating the interactions between the generator 108, the sensor unit 110, and the control station 112 when calculating a calibration coefficient. In the flow diagram, time flows from the top of the diagram to the bottom and horizontal lines represent communications between the various entities. FIG. 4 illustrates only major interactions between the entities and does not represent every interaction.

Initially, the X-ray technologist positions 410 the X-ray generator 108 and the sensor unit 110 in the desired positions. In one embodiment of the present invention, the sensor unit 110 is stationary and only the generator 108 can be positioned. In another embodiment, both the generator 108 and the sensor unit 110 are freely positionable.

The X-ray system 100 uses a calibration coefficient to calculate the collimation parameters. There is a linear relationship between movement of the aperture 226 and movement of the exposure boundary on the sensor unit 110. This relationship is defined by the calibration coefficient as follows:

$$(\text{aperture displacement})\times(\text{calibration coefficient})=\text{exposure boundary displacement}$$

The calibration coefficient varies with the distance between the generator 108 and the sensor unit 110. In a preferred embodiment of the present invention, and most X-ray systems, however, this distance is fixed. Therefore, once the calibration coefficient is determined and stored in the control station 112, there is no need for re-calibration unless the source-sensor distance is changed to a distance for which there is no stored coefficient.

To calculate the calibration coefficient, the aperture 226 in the collimator 212 is moved 412 to a constricted position. Then, the generator 108 generates 412 a relatively short duration beam of X-ray radiation towards the sensor unit 110. In one embodiment, the short duration beam lasts for approximately 20 milliseconds. Preferably, the beam is generated in response to the technologist entering a command on the control station 112. The beam is captured 414 by the sensor unit 110 and converted into a digital image or other digital format. This image is transmitted 416 to the control station 112 via the communications link 122. The control station 112 analyzes 428 and stores the image.

After the first image is analyzed, the aperture 226 is opened by a displacement $d_1$ and the process is repeated. The aperture 226 is preferably opened automatically by the actuator 230 in response to control signals received 420 from the control station 112. The control station 112 analyzes the two images and determines the resultant exposure boundary displacement $d_2$ corresponding to the aperture displacement $d_1$. The control station 112 calculates 428 and stores the calibration coefficient as $d_2/d_1$ and associates it with the source-sensor distance. These calibration steps can be repeated as many times as are necessary or desired to establish one or more calibration coefficients.

Figure 5:
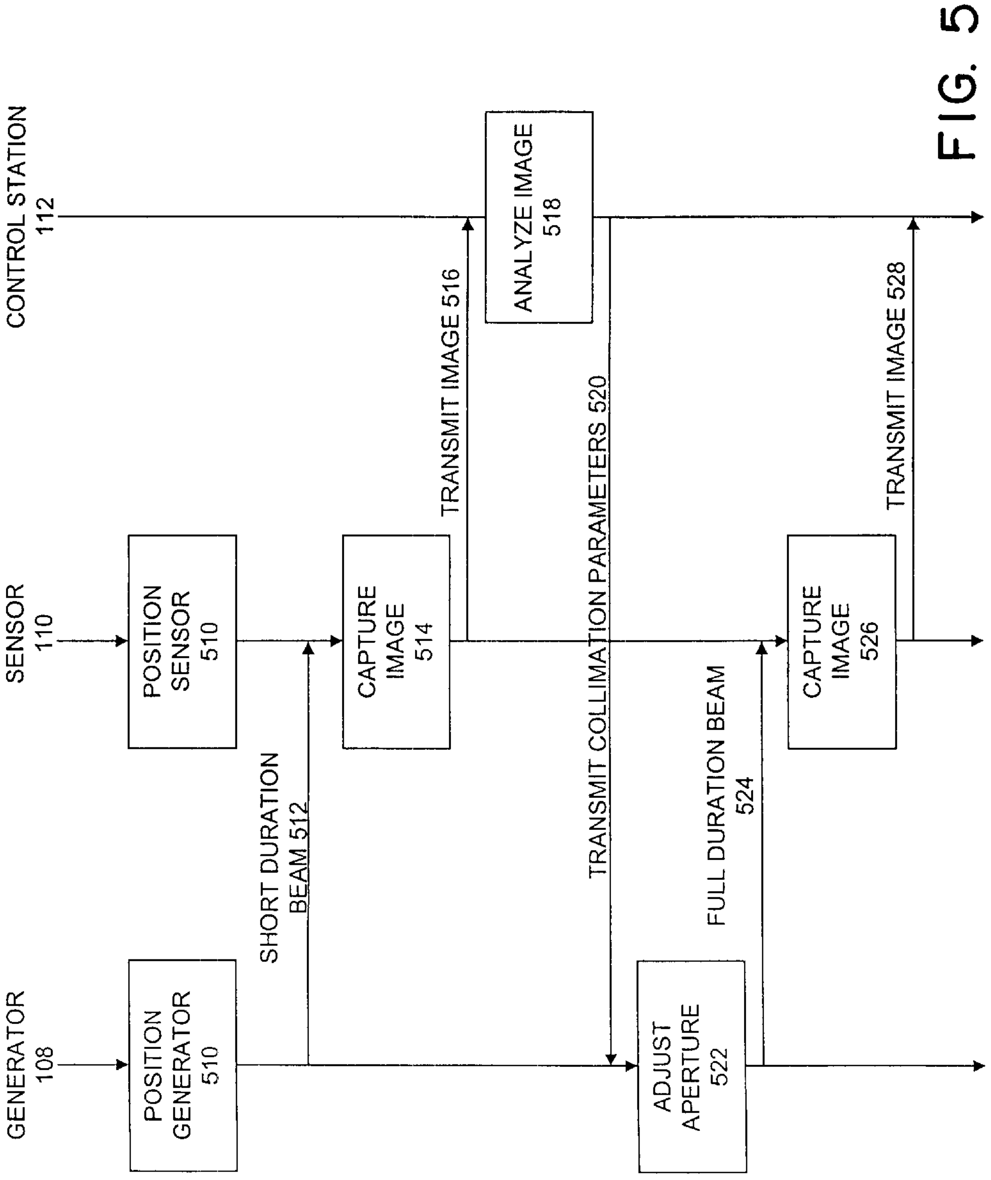
FIG. 5 is a flow diagram illustrating the interactions between the generator 108, the sensor unit 110, and the control station 112 when adjusting the aperture 226 to achieve a desired goal while capturing an image.

Once the calibration coefficient is established, the X-ray system 100 is calibrated for the particular use. FIG. 5 is a flow diagram illustrating the interactions between the generator 108, the sensor 110, and the control station 112 when adjusting the aperture 226 to achieve a desired goal while capturing an image. The X-ray subject can optionally be present while the technologist calibrates the X-ray system 100 for the particular use.

To calibrate the X-ray system 100 for a particular use, the technologist first positions 510 the generator 108 and sensor 110 and uses 512 a short duration X-ray beam to capture 514 a reference image. This reference image is transmitted 516 to the control station 112 and the control station analyzes 518 the image and uses the calibration coefficient to generate collimation parameters. These parameters are transmitted 520 to the generator and cause the actuator 230 to adjust 522 the aperture 226. These steps can be repeated as many times as are necessary or desired to achieve a desired collimation.

In one embodiment, the control station 112 constricts the aperture 226 and uses the reference image(s) and calibration coefficient to calculate collimation parameters for widening the beam to cover the entire field of the sensor unit 110. In another embodiment, the control station 112 uses the reference images to determine where on the sensor unit 110 a maximum (unattenuated) signal was received. The control station 112 uses the calibration coefficient to determine precisely by how much the beam should be constricted to eliminate unwanted exposure beyond the periphery of the X-ray subject or other object being X-rayed. This constriction minimizes the area of the sensor unit 110 receiving X-rays not passing through the X-ray subject and thereby reduces unwanted X-ray scatter. In a third embodiment, the technologist views the reference image captured from the short duration exposure and defines the desired area of exposure. For example, the technologist can use a keyboard, mouse, or other input device to define the borders of the desired area of exposure. The control station 112 uses the calibration coefficient to determine by how much the beam should be constricted or expanded to cover only the defined region.

Once the collimator 212 is properly adjusted, the technologist preferably positions the subject to be X-rayed between the generator 108 and the sensor unit 110 (if the subject is not already so positioned) and causes the generator 108 to generate 524 a full duration beam. In one embodiment, the fill duration is approximately 200 milliseconds. The X-ray image is captured 526 by the sensor unit 110 and transmitted 528 to the control station 112 for subsequent processing.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method for collimating radiation, comprising the steps of:

analyzing a plurality of collimation images captured by a sensor unit for capturing an x-ray image based on x-ray radiation from a generator, wherein in capturing the plurality of collimation images the x-ray radiation is collimated to a plurality of different positions by a collimator for collimating x-ray radiation and wherein in analysis of the plurality of collimation images, a calibration coefficient is calculated for calibration of the collimator, the calibration coefficient at least being responsive to a relationship, in the plurality of collimation images, between movement of an aperture in the collimator and movement of an exposure boundary on the sensor unit; and generating a collimation parameter for collimation of the collimator at least in accordance with the calibration coefficient, a reference image from the sensor unit, and an area defined on the reference image.

2. A method according to claim 1, wherein the analyzing step is for analyzing two collimation images from the sensor unit responsive to two exposures of x-ray radiation collimated to two different positions by the collimator, and wherein the calibration coefficient is calculated responsive to a linear relationship between movement of the aperture in the collimator and movement of an exposure boundary on the sensor unit.

3. A method according to claim 1, wherein the collimation parameter is generated such that radiation from the generator covers an entire field of the sensor unit.

4. A method according to claim 1, further comprising the steps of:

displaying the reference image; and defining an area on the displayed reference image;

wherein the generating step is for generating a collimation parameter for radiating the defined area.

5. A method according to claim 1, wherein the generating step comprises the steps of:

analyzing the reference image to determined if radiation extends beyond an object to be radiated; and calculating the collimation parameter for reducing radiation extending beyond the object to be radiated, responsive to a positive determination that radiation extends beyond the object to be radiated.

6. A method according to claim 1, wherein the area defined on the reference image is defined with an input device by a user.

7. An x-ray system comprising:

a sensor unit for capturing an x-ray image based on x-ray radiation from a generator; and a control unit coupled to the sensor unit and a collimator for collimating x-ray radiation from the generator;

wherein the control unit comprises:

a calibration unit for analyzing a plurality of collimation images captured by a sensor unit for capturing an x-ray image based on x-ray radiation from a generator, wherein in capturing the plurality of collimation images the generator is collimated to a plurality of different positions by a collimator for collimating x-ray radiation and wherein in analysis of the plurality of collimation images, a calibration coefficient is calculated for calibration of the collimator, the calibration coefficient at least being responsive to a relationship, in the plurality of collimation images, between movement of an aperture in the collimator and movement of an exposure boundary on the sensor unit; and a parameter generation unit for generating a collimation parameter for collimation of the collimator at least in accordance with the calibration coefficient, a reference image from the sensor unit, and an area defined on the reference image.

8. An x-ray system according to claim 7, wherein the calibration unit analyzes two collimation images from the sensor unit responsive to two exposures of x-ray radiation collimated to two different positions by the collimator, and calculates the calibration coefficient responsive to a linear relationship between movement of the aperture in the collimator and movement of an exposure boundary on the sensor unit.

9. An x-ray system according to claim 7, wherein the area defined on the reference image is defined with an input device by a user.

10. An x-ray system according to claim 7, wherein the area defined on the reference image corresponds to an entire field of the sensor unit.

11. An x-ray system according to claim 7, wherein the area defined on the reference image is defined to reduce radiation extending beyond an object to be radiated.

12. A computer-readable medium storing a computer-executable program, the computer program comprising instructions for:

analyzing a plurality of collimation images captured by a sensor unit for capturing an x-ray image based on x-ray radiation from a generator, wherein in capturing the plurality of collimation images the generator is collimated to a plurality of different positions by a collimator for collimating x-ray radiation and wherein in analysis of the plurality of collimation images, a calibration coefficient is calculated for calibration of the collimator, the calibration coefficient at least being responsive to a relationship, in the plurality of collimation images, between movement of an aperture in the collimator and movement of an exposure boundary on the sensor unit; and generating a collimation parameter for collimation of the collimator at least in accordance with the calibration coefficient, a reference image from the sensor unit, and an area defined on the reference image.

13. A computer-readable medium according to claim 12, wherein the analyzing instruction is for analyzing two collimation images from the sensor unit responsive to two exposures of x-ray radiation collimated to two different positions by the collimator, and the calibration coefficient is calculated responsive to a linear relationship between movement of the aperture in the collimator and movement of an exposure boundary on the sensor unit.

14. A computer-readable medium according to claim 12, wherein the collimation parameter is generated for radiation to cover an entire field of the sensor unit.

15. A computer-readable medium according to claim 12, wherein the generating instruction comprises instructions for:

analyzing the reference image to determine if radiation extends beyond an object to be radiated; and calculating the collimation parameter for reducing radiation extending beyond the object to be radiated, responsive to determination that radiation extends beyond the object to be radiated.

16. A computer-readable medium according to claim 12, wherein the area defined on the reference image is defined with an input device by a user.

* * * * *

UNITED STATES PATENT AND TRADEMARK OFFICE

CERTIFICATE OF CORRECTION

PATENT NO. : 6,502,985 B1
DATED : January 7, 2003
INVENTOR(S) : Harry T. Garland et al.

It is certified that error appears in the above-identified patent and that said Letters Patent is hereby corrected as shown below:

Column 3,
Line 55, "the." should read -- the --.

Column 6,
Line 58, "determined" should read -- determine --.

Signed and Sealed this

Eighth Day of July, 2003

JAMES E. ROGAN
*Director of the United States Patent and Trademark Office*